US009712220B2

(12) United States Patent
Grossman

(10) Patent No.: US 9,712,220 B2
(45) Date of Patent: *Jul. 18, 2017

(54) COMMUNICATION SYSTEM FOR SPATIALLY-ENCODED WIRELESS COMMUNICATIONS

(71) Applicant: Warren Grossman, Toronto (CA)

(72) Inventor: Warren Grossman, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/049,234

(22) Filed: Feb. 22, 2016

(65) Prior Publication Data

US 2016/0248493 A1  Aug. 25, 2016

Related U.S. Application Data

(63) Continuation of application No. 14/237,109, filed as application No. PCT/CA2012/000724 on Aug. 3, 2012, now Pat. No. 9,270,353.

(60) Provisional application No. 61/515,117, filed on Aug. 4, 2011.

(51) Int. Cl.
| | |
|---|---|
| *H04B 1/02* | (2006.01) |
| *H04B 7/06* | (2006.01) |
| *H01Q 21/06* | (2006.01) |
| *H04L 27/26* | (2006.01) |
| *H04L 1/06* | (2006.01) |

(52) U.S. Cl.
CPC ......... *H04B 7/0608* (2013.01); *H01Q 21/061* (2013.01); *H01Q 21/065* (2013.01); *H04B 7/06* (2013.01); *H04B 7/0602* (2013.01); *H04L 1/0625* (2013.01); *H04L 27/2626* (2013.01)

(58) Field of Classification Search
CPC .. H04B 7/0602; H04B 7/0604; H04B 7/0608; H01Q 21/061; H04L 27/2626; H04L 1/0625
See application file for complete search history.

(56) References Cited

U.S. PATENT DOCUMENTS

| | | | | |
|---|---|---|---|---|
| 8,340,197 | B2* | 12/2012 | Uhl | H04L 27/20 343/700 MS |
| 8,411,794 | B2* | 4/2013 | Uhl | H04L 27/20 375/299 |
| 8,457,251 | B2* | 6/2013 | Uhl | H04B 1/69 375/299 |
| 9,270,353 | B2* | 2/2016 | Grossman | H01Q 21/061 |
| 2010/0207819 | A1* | 8/2010 | Uhl | H01Q 3/2605 342/372 |

* cited by examiner

*Primary Examiner* — Duc M Nguyen
(74) *Attorney, Agent, or Firm* — Graham Patent Law

(57) ABSTRACT

A method of spatially-encoded wireless transmission using a wireless communications device that is configured with an electromagnetic radiator involves applying a modulated carrier to one or more radiator elements of the electromagnetic radiator. The radiator elements are selected based on instantaneous samples of baseband information, and the modulated carrier is generated from the baseband information. The modulated carrier is then transmitted via the selected radiator elements.

12 Claims, 4 Drawing Sheets

COMMUNICATION SYSTEM FOR SPATIALLY-ENCODED WIRELESS COMMUNICATIONS

RELATED APPLICATIONS

This patent application claims the benefit of the filing date of U.S. provisional patent application Ser. No. 61/515,117, filed Aug. 4, 2011, entitled "Communication System for Spatially-Encoded Wireless Communications".

FIELD OF THE INVENTION

This patent application relates to a method and system of wireless communication.

BACKGROUND

RF wireless communications devices include a RF antenna and transceiver that allows the communications device to transmit and receive wireless information via a wireless communications protocol. Known wireless communications protocols include long-range protocols (e.g. GSM, GPRS, CDMA, EDGE, UMTS, EvDO, HSPA) and short-range protocols (irDA, Bluetooth (IEEE 802.15), and WiFi (IEEE 802.11x)). None of these communications protocols make optimum use of the available communications bandwidth.

SUMMARY

This patent application describes a wireless communications device and associated communications protocol that allows the communications device to wirelessly transmit information by spatially-encoding an electromagnetic carrier (e.g. modulating the diameter and/or radial position and/or angular position of the carrier) with a portion of the information to be transmitted.

In accordance with a first aspect of the disclosure, there is provided a wireless communications device that comprises an electromagnetic radiator and a signal processor coupled to the radiator. The electromagnetic radiator comprises an array of electromagnetic radiator elements. The signal processor is configured to effect applying of a modulated electromagnetic carrier to one or more of the radiator elements selected, in real-time, based on instantaneous samples of baseband information, and to effect transmission of the modulated carrier via the selected radiator elements. The modulated carrier is generated from the baseband information.

In accordance with a second aspect of the disclosure, there is provided a method of wireless transmission of baseband information using a wireless communications device. The wireless communications device is configured with an electromagnetic radiator comprising an array of electromagnetic radiator elements. The method comprises the wireless communications applying a modulated carrier to one or more of the radiator elements of the electromagnetic radiator, and transmitting the modulated carrier via the selected radiator elements. The wireless communications device selects the one or more radiator elements, in real time, based on instantaneous samples of baseband information. The wireless communications device generates the modulated carrier from the baseband information.

The signal processor may be configured to select the one or more radiator elements so as to vary the diameter of the transmitted carrier based on the instantaneous baseband information. The signal processor may be configured to select the one or more radiator elements so as to vary the radial position of the transmitted carrier, relative to a centre of the transmission, based on the instantaneous baseband information. The signal processor may be configured to select the one or more radiator elements so as to vary the angular position of the transmitted carrier, relative to a reference angular position, based on the instantaneous baseband information.

Since a portion of the baseband data is encoded into the carrier by modulating the diameter and/or the radial position and/or the angular position of the carrier, the wireless communications device and the method of wireless transmission can make better use of the available communications bandwidth.

BRIEF DESCRIPTION OF THE DRAWINGS

An exemplary wireless communications device, and method of wireless transmission will now be described, with reference to the accompanying drawings, in which.

DETAILED DESCRIPTION

Figure 1:
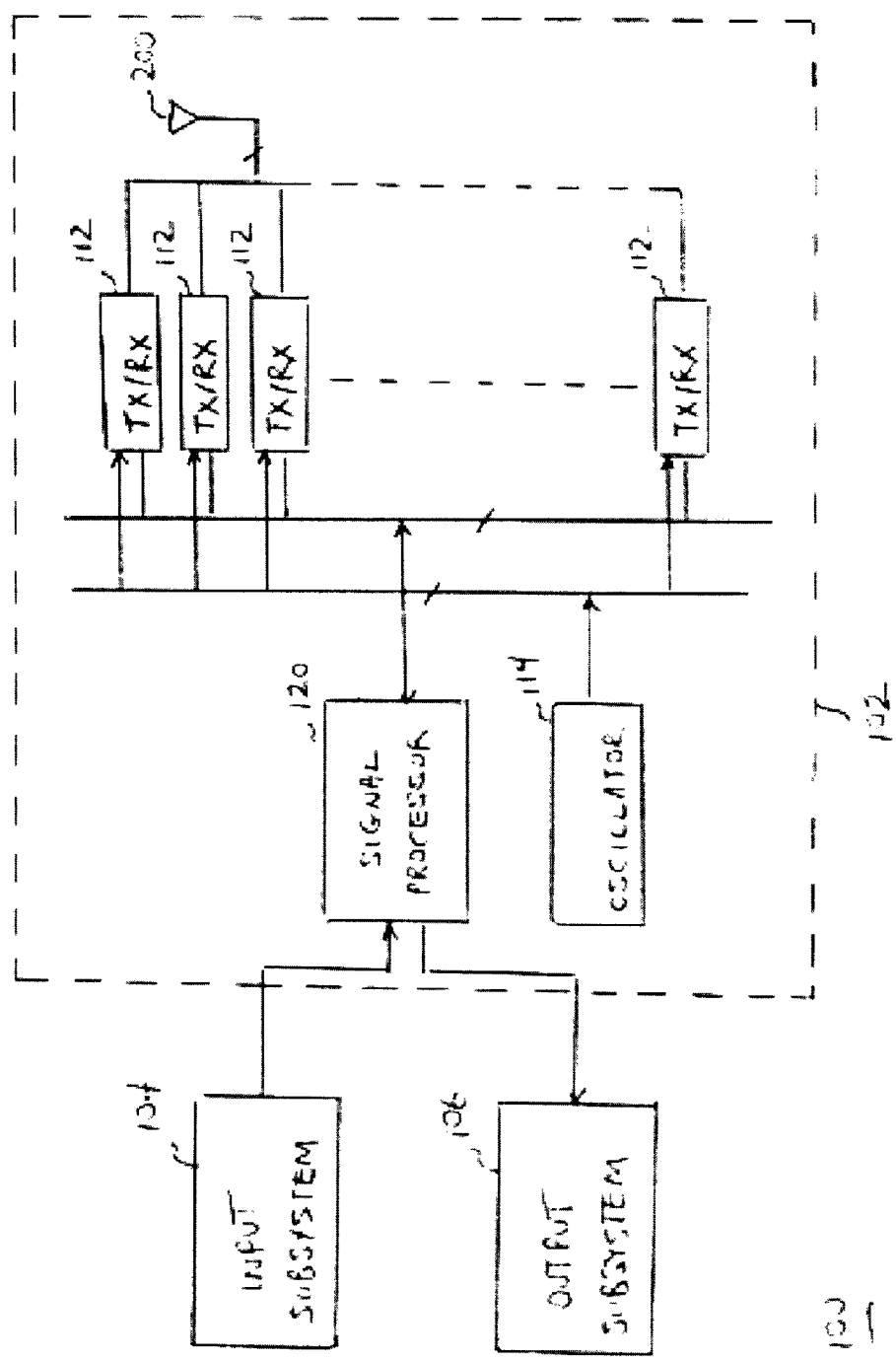
FIG. 1 is a schematic view of the communications device, depicting the signal processor, a local oscillator, and an electromagnetic radiator.

FIG. 1 is a schematic view of a wireless communications device, denoted generally as 100. Preferably, the wireless communications device 100 is a two-way wireless communications device. Depending on the exact functionality provided, the wireless communications device 100 may be referred to as a wireless data communication device, a wireless telephone, a portable computer, or a wireless base station, as examples.

The wireless communications device 100 includes a communication subsystem 102, and may also include an input subsystem 104 and an output subsystem 106 both coupled to the communication subsystem 102. The input subsystem 104 allows the user of the wireless communications device 100 to provide data and/or voice input to the wireless communications device 100, and may include a keyboard and/or a microphone, as examples. The output subsystem 106 provides visual and/or sound output for the user of the wireless communications device 100, and may include a LCD display and/or a speaker, as examples.

The communication subsystem 102 performs communication functions, such as data and voice communications, and includes a plurality of transceivers (transmitters/receivers) 112, and a local oscillator 114, an electromagnetic radiator 200 and a signal processor 120 coupled to the transceivers 112. Electromagnetic signals are received by the electromagnetic radiator 200 and intended for receipt by the output subsystem 106 are input to the transceivers 112, which perform functions such as frequency down conversion and analog to digital conversion, in preparation for more complex communication functions performed by the signal processor 120. Conversely, data intended to be transmitted by the input subsystem 104 are processed by the signal processor 120 and input to the transceivers 112 in preparation for transmission via the electromagnetic radiator 200.

Preferably, the electromagnetic radiator 200 comprises an array of electromagnetic radiator elements. Each radiator element is configured to transmit and/or receive electromagnetic radiation. Multiple embodiments of the electromagnetic radiator 200 are envisaged. In one embodiment, depicted in FIGS. 2a and 2b, the electromagnetic radiator 200 may comprise an RF antenna array, and the electromagnetic radiator elements are configured as a plurality of grounded monopoles which comprise a ground plane 210, and a plurality of elongate conductors 212. Each elongate conductor 212 may be electrically isolated from the ground plane 210, but extending through the ground plane 210 from a respective radiator feed point 214 that is disposed below the ground plane 210.

Figure 2A:
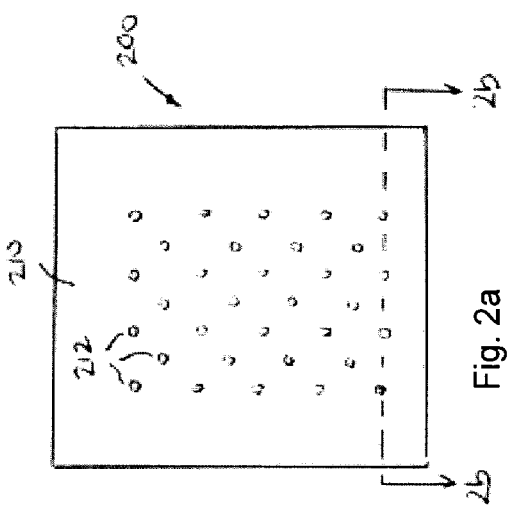
FIGS. 2a and 2b are respectively a top plan view and a side elevation of a first embodiment of the electromagnetic radiator.
Figure 2B:
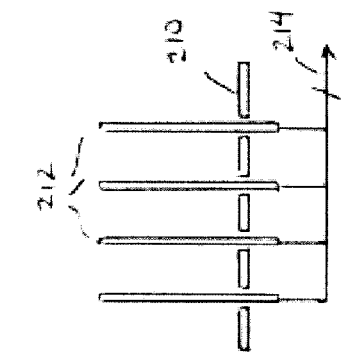
Figure 3:
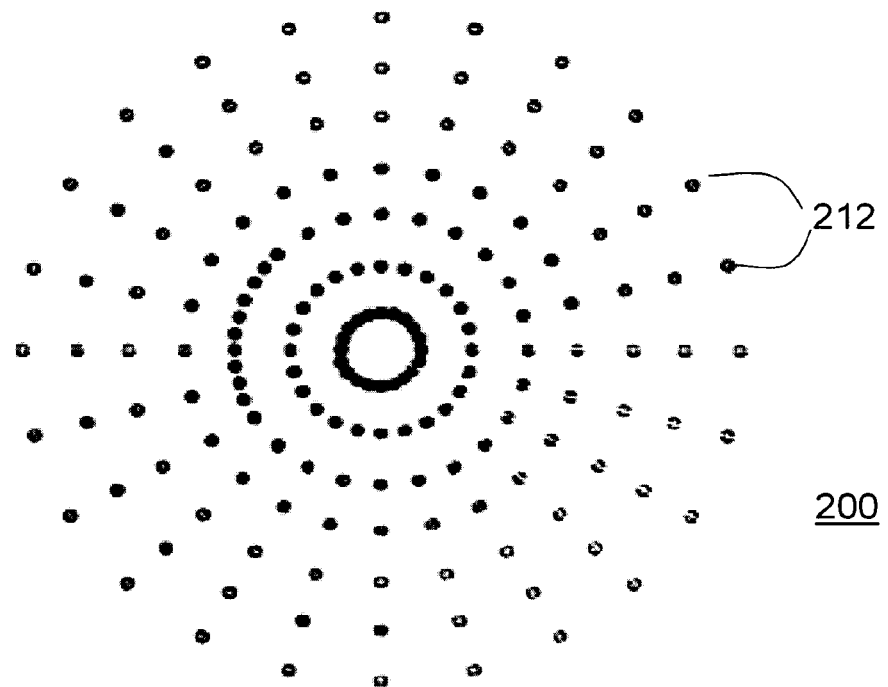
FIG. 3 depicts a second embodiment of the electromagnetic radiator.

In the embodiment of FIGS. 2a and 2b, the elongate conductors 212 are substantially equidistantly spaced about the surface 210. In another embodiment, depicted in FIG. 3, the elongate conductors 212 define a plurality of concentric circles. Moreover, the density of elongate conductors 212 in each circle may be greater in the inner circles than in the outer circles. For instance, each circle may include the same number of elongate conductors 212, with the result that the distance between adjacent conductors 212 in the inner circles is less than the distance between adjacent conductors 212 in the outer circles.

Figure 4A:
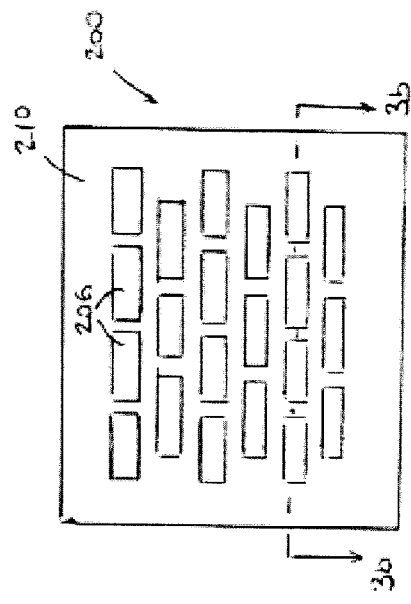
FIGS. 4a and 4b depict a third embodiment of the electromagnetic radiator.
Figure 4B:
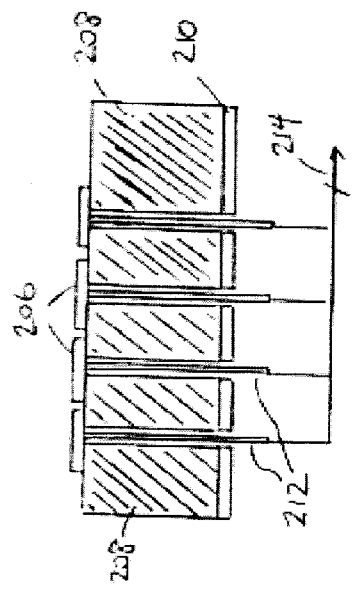

In another embodiment, depicted in FIGS. 4a and 4b, the electromagnetic radiator 200 may again comprise an RF antenna array, but the electromagnetic radiator elements are configured as a plurality of patch antennas which comprise a conductive layer 206, the ground plane 210, and the plurality of elongate conductors 212. A dielectric substrate 208 may be disposed between the conductive layer 206 and the ground plane 210. In this embodiment, the conductive layer 206 and the ground plane 210 are disposed on opposite faces of the dielectric substrate, and the conductive layer 206 is provided as a plurality of planar antenna elements that are electrically isolated from each other. Preferably, the conductive layer 206 is oriented substantially parallel to the ground plane 210. Each elongate conductor 212 is electrically isolated from the ground plane 210, but extends through the ground plane 210 and the dielectric, from a respective radiator feed point 214 that is disposed below the ground plane 210, and terminates at a respective planar antenna element.

In each embodiment, preferably the ground plane 210 comprises a planar ground plane, and the elongate conductors 212 are disposed about the ground plane 210, perpendicular to the ground plane 210, to thereby provide a planar antenna array. Alternately, the ground plane 210 may comprise an arcuate ground plane, and the elongate conductors 212 are disposed about the ground plane 210 to thereby provide an arcuate antenna array. Further, each radiator feed point 214 is coupled to a respective one of the transceivers 112, and each transceiver 112 is connected to the signal processor 120 via a local bus.

Alternately, the electromagnetic radiator 200 depicted in FIGS. 2a, 2b, 3, 4a and 4b may comprise a laser array, with the electromagnetic radiator elements being configured as laser transmitter/receivers 212. Each laser transmitter/receiver 212 may mounted on a substrate 210, and may be connected to a respective radiator feed point 214 that is disposed below the substrate 210. As an example, each laser transmitter/receiver 212 may comprise a semiconductor laser diode that is closely-mounted or integrated with a laser phototransistor. Preferably, each semiconductor laser diode is configured to produce a beam of monochromatic, low divergent, singularly-polarized light, and the wave-front of each light beam is coherent over the distance between the electromagnetic radiator 200 and the corresponding receiver. Similarly, preferably each laser phototransistor is configured to detect a beam of monochromatic, low divergent, singularly-polarized light directed at the phototransistor.

The signal processor 120 is configured with computer processing instructions which, when executed by the signal processor 120, implements a signal processing procedure. The operation of the signal processing procedure will be discussed in greater detail below. However, it is sufficient at this point to note that the signal processing procedure is configured to initiate electromagnetic (RF or laser) transmission of baseband information received from the input subsystem 104 by selecting one or more of the transceivers 112 (and their associated radiator elements) for transmission by the electromagnetic radiator 200, based on the received baseband information. The signal processing procedure is also configured to facilitate delivery of baseband information to the output subsystem 106 based on the transceivers 112 (and the associated radiator elements) from which the signal processor receives demodulated electromagnetic (RF or laser) transmissions. It should also be understood that although the signal processing procedure may be implemented as a set of computer processing instructions, the functionality of the signal processing procedure may be implemented in electronics hardware instead.

When the communication subsystem 102 is in signal transmission mode, the signal processor 120 receives the baseband information from the input subsystem 104 as a series of digital values, and uses a portion of the received baseband information to select one or more transceivers 112 and transmits the baseband information to each of the selected transceivers 112. Each selected transceiver 112 performs digital to analog conversion on the baseband information, and uses the analog baseband information to modulate the amplitude and/or phase of the carrier generated by the local oscillator 114. Each transceiver 112 applies the modulated carrier to the associated radiator feed point(s) 214. As a result, the modulated carrier is only transmitted (as a RF or laser transmission) from the radiator elements that are associated with the selected radiator feed points 214.

The signal processor 120 selects transceivers 112 and varies the selection thereof (and hence also varies the selection of radiator feed points 214), in real-time, in accordance with a portion of each digital baseband value. In one implementation, the signal processor 120 varies the selection of transceivers 112 (and hence the location of active radiator feed points 214), in real-time, so that the instantaneous angular position of each modulated carrier, as each modulated carrier is transmitted by the electromagnetic radiator 200, varies based on the baseband information.

For example, assuming that the location of each radiator feed point 214 on the surface of the electromagnetic radiator 200 can be specified by its polar co-ordinates (e.g. radius from a reference point on the surface of the electromagnetic radiator 200, and angular position relative to a reference angular position on the surface of the electromagnetic radiator 200), the signal processor 120 may select the radiator feed point(s) 214 such that the instantaneous angular position of each electromagnetic (RF or laser) transmission from the surface of the electromagnetic radiator 200, relative to a reference angular position on the surface of the electromagnetic radiator 200, increases, in real-time, as a characteristic (e.g. amplitude, frequency, phase) of the baseband information increases, and the instantaneous angular position of each electromagnetic transmission from the surface of the electromagnetic radiator 200, relative to a reference angular position on the surface of the electromagnetic radiator 200, decreases, in real-time, as the characteristic of the baseband information decreases. At the same time, the signal processor 120 may also cause each selected transceiver 112 to increase the frequency and/or phase of each electromagnetic transmission, in real time, as the same or a different characteristic of the baseband information increases, and may cause each selected transceiver 112 to decrease the frequency and/or phase of each electromagnetic transmission, in real time, as the same or a different characteristic of the baseband information decreases.

Figure 5:
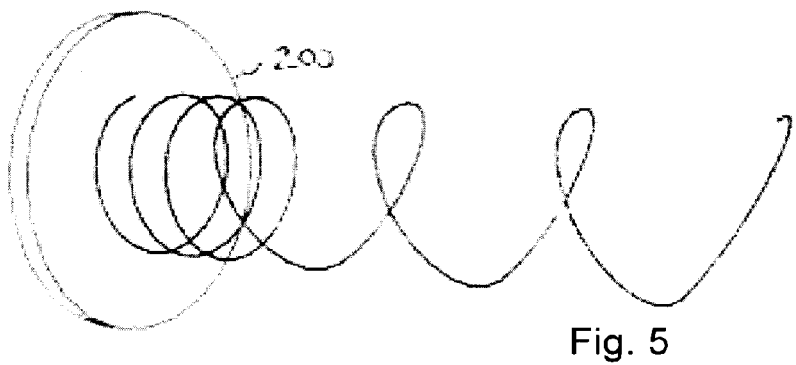
FIG. 5 depicts a sample wireless transmission according to the method of wireless transmission in which the rate of change of angular position of the transmitted carrier varies based on the baseband information.

Alternately, as shown in FIG. 5, the signal processor 120 may select the radiator feed point(s) 214 such that the instantaneous rate of change of the angular position of each electromagnetic (RF or laser) transmission from the surface of the electromagnetic radiator 200, increases, in real-time, as a characteristic of the baseband information increases, and the instantaneous rate of change of the angular position of each electromagnetic transmission decreases, in real-time, as the characteristic of the baseband information decreases. The signal processor 120 may also simultaneously activate multiple radiator feed points 214, and vary the instantaneous rate of change of the angular position of each transmission based on respective characteristics of the baseband information. Although not shown in FIG. 5, at the same time, the signal processor 120 may also cause each selected transceiver 112 to increase the frequency and/or phase of each transmission, in real time, as the same or a different characteristic of the baseband information increases, and may cause each selected transceiver 112 to decrease the frequency and/or phase of each electromagnetic transmission, in real time, as the same or a different characteristic of the baseband information decreases.

In another implementation, the signal processor 120 varies the selection of transceivers 112 (and hence the location of active radiator feed points 214), in real-time, so that the instantaneous radial position of each modulated carrier, as the modulated carrier is transmitted by the electromagnetic radiator 200, relative to the centre of all such electromagnetic transmissions, varies based on the baseband information.

For example, assuming again that the location of each radiator feed point 214 on the surface of the electromagnetic radiator 200 can be specified by its polar co-ordinates (e.g. radius from a reference point on the surface of the electromagnetic radiator 200, and angular position relative to a reference angular position on the surface of the electromagnetic radiator 200), the signal processor 120 may select the radiator feed point(s) 214 such that the instantaneous radial position of each electromagnetic (RF or laser) transmission from the surface of the electromagnetic radiator 200, relative to the centre of all such electromagnetic transmissions, increases, in real-time, as a characteristic of the baseband information increases, and the instantaneous radial position of each electromagnetic transmission from the surface of the electromagnetic radiator 200, relative to the centre of all such electromagnetic transmissions, decreases, in real-time, as the characteristic of the baseband information decreases. At the same time, the rate of change of the angular position of each electromagnetic transmission may remain constant.

Figure 6:
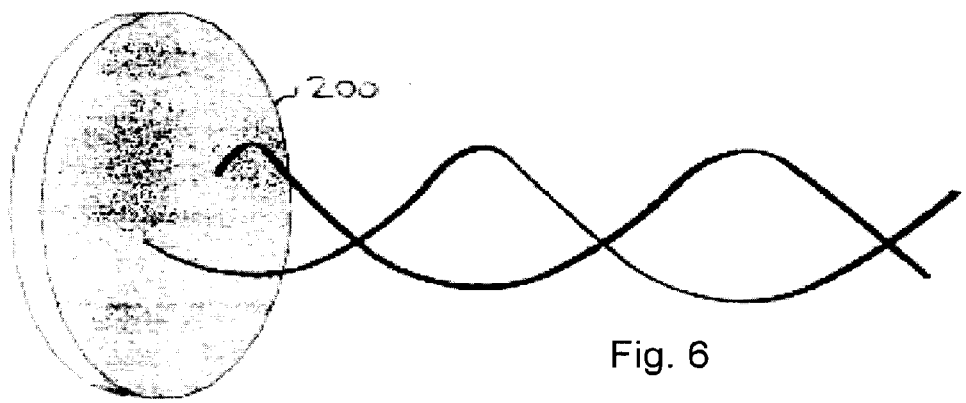
FIG. 6 depicts a sample wireless transmission in which the radial position of the transmitted carriers vary based on the baseband information.

As shown in FIG. 6, the signal processor 120 may simultaneously activate multiple radiator feed points 214, and vary the instantaneous radial position of each electromagnetic transmission, relative to the centre of all such transmissions, based on respective characteristics of the baseband information. Preferably, the radiator feed points 214 are activated/deactivated in a sequence that produces two (or more) distinct simultaneous electromagnetic transmissions. Moreover, preferably the simultaneous electromagnetic transmissions do not interfere with one another, in the sense that a receiver that receives the two (or more) electromagnetic transmissions can correctly decode the information that is encoded in each electromagnetic transmission. The electromagnetic radiator 200 depicted in FIG. 3 may be particularly advantageous for implementing this modulation scheme.

At the same time, the signal processor 120 may also cause each selected transceiver 112 to increase the frequency and/or phase of each electromagnetic transmission, in real time, as the same or a different characteristic of the baseband information increases, and may cause each selected transceiver 112 to decrease the frequency and/or phase of each electromagnetic transmission, in real time, as the same or a different characteristic of the baseband information decreases.

Figure 7:
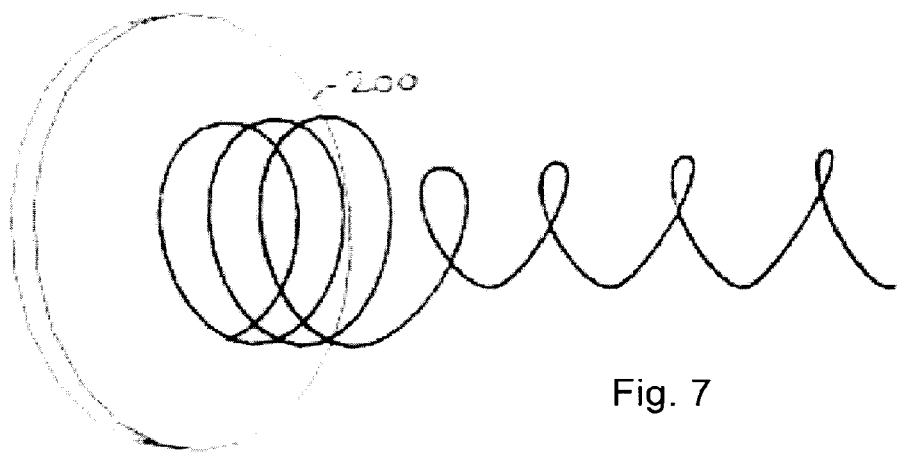
FIG. 7 depicts a sample wireless transmission in which the radial position and the rate of change of angular position of the transmitted carrier varies based on the baseband information.

Alternately, the signal processor 120 may select the radiator feed point(s) 214 based on a combination of the foregoing controls. For example, as shown in FIG. 7, the signal processor 120 may select the radiator feed point(s) 214 such that the rate of change of the angular position of each electromagnetic transmission from the surface of the electromagnetic radiator 200, increases, in real-time, as a characteristic of the baseband information increases, and the instantaneous radial position of each electromagnetic transmission from the surface of the electromagnetic radiator 200, relative to the centre of all such transmissions, increases, in real-time, as another characteristic of the baseband information increases. Conversely, the rate of change of the angular position of each electromagnetic transmission from the surface of the electromagnetic radiator 200 may increase, in real-time, as a characteristic of the baseband information decrease, and the instantaneous radial distance of each electromagnetic transmission from the surface of the electromagnetic radiator 200, relative to the centre of all such transmissions, may decrease, in real-time, as another characteristic of the baseband information increases. Again, the electromagnetic radiator 200 depicted in FIG. 3 may be particularly advantageous for implementing this modulation scheme.

Although not shown in FIG. 6, at the same time, the signal processor 120 may also cause each selected transceiver 112 to increase the frequency and/or phase of each electromagnetic transmission, in real time, as the same or a different characteristic of the baseband information increases, and may cause each selected transceiver 112 to decrease the frequency and/or phase of each electromagnetic transmission, in real time, as the same or a different characteristic of the baseband information decreases.

In another implementation, the signal processor 120 varies the instantaneous number of transceivers 112 that are selected, in real-time, so that the diameter of the modulated carrier, as it is transmitted by the electromagnetic radiator 200, varies based the baseband information. Simultaneously, the signal processor 120 may also cause each selected transceiver 112 to vary a different characteristic of each electromagnetic transmission, in real time, based the baseband information.

For example, the signal processor 120 may increase the instantaneous number of transceivers 112 (and hence the instantaneous number of radiator feed points 214) selected, in real-time, as a characteristic of the baseband information increases, and may decrease the instantaneous number of transceivers 112 (and hence the instantaneous number of radiator feed points 214) selected, in real-time, as the characteristic of the baseband information decreases. At the same time, the signal processor 120 may also cause each selected transceiver 112 to increase the frequency and/or phase of each electromagnetic transmission, in real time, as the same or a different characteristic of the baseband information increases, and may also cause each selected transceiver 112 to decrease the frequency and/or phase of each electromagnetic transmission, in real time, as the same or a different characteristic of the baseband information decreases.

When the communication subsystem 102 is in signal reception mode, each transceiver 112 receives a modulated carrier from the associated radiator feed point 214 of the electromagnetic radiator 200, and uses the carrier generated by the local oscillator 114 to demodulate the modulated carrier and recover a portion of the information that was encoded in the modulated carrier. Each transceiver 112 performs analog to digital conversion on the recovered information, and forwards the recovered information to the signal processor 120 as a series of digital values. Based on the transceivers 112 (and hence antenna feed points 214) from which the signal processor 120 receives the digital values, the signal processor 120 recovers the remainder of the digital baseband information that was encoded in the modulated carrier.

As above, the instantaneous diameter of the modulated carrier may vary based on the baseband information, in which case the signal processor 120 may recover each digital baseband value, in real-time, from the instantaneous diameter of the modulated carrier as at the surface of the electromagnetic radiator 200. Alternately, the instantaneous radial position of the modulated carrier may vary based on the baseband information, in which case the signal processor 120 may recover each digital baseband value, in real-time, from the instantaneous radial distance of the received modulated carrier relative to the centre of the reception at the surface of the electromagnetic radiator 200. Alternately, or additionally, the instantaneous angular position of the modulated carrier may vary based on the baseband information, in which case the signal processor 120 may recover each digital baseband value, in real-time, from the instantaneous angular position of the received modulated carrier relative to a reference angular position at the surface of the electromagnetic radiator 200. Depending on the wavelength selected, the foregoing methods of modulation may be advantageously implemented in short-range and/or line-of-sight wireless communications networks.

The invention claimed is:

1. A wireless communications device comprising:
   an electromagnetic radiator comprising an array of radiator elements; and
   a signal processor coupled to the electromagnetic radiator, the signal processor being configured to receive baseband information, the signal processor further configured to transmit an electromagnetic signal from the electromagnetic radiator by applying a carrier signal to the electromagnetic radiator, the applying a carrier signal comprising continuously rotating a feed point of the carrier signal between the radiator elements at an angular rate and at an instantaneous radius relative to a common reference point, and varying the instantaneous radius, in real-time, based on the received baseband information.

2. The wireless communications device according to claim 1, wherein the radiator elements each has a respective radial position relative to the common reference point, and the transmitting an electromagnetic signal comprises selecting one or more of the radiator elements in real-time each based on the respective radial position thereof and the instantaneous radius, and applying the carrier signal to the one or more selected radiator elements.

3. The wireless communications device according to claim 2, wherein the signal processor is configured to vary a diameter of the electromagnetic signal, in real time, by varying the instantaneous radius based on one characteristic of the received baseband information, and to vary the rate of angular rotation based on another aspect of the received baseband information.

4. The wireless communications device according to claim 3, wherein the transmitting an electromagnetic signal further comprises varying at least one of a frequency and a phase of the carrier signal based on the baseband information.

5. The wireless communications device according to claim 2, wherein the transmitting an electromagnetic signal further comprises varying at least one of a frequency and a phase of the carrier signal based on the baseband information.

6. The wireless communications device according to claim 2, wherein the selecting the one or more radiator elements comprises selecting the one or more radiator elements so as to produce at least two distinct simultaneous transmissions of the electromagnetic signal.

7. A method of spatially-encoded wireless transmission of baseband information using a wireless communications device, the wireless communications device being configured with an electromagnetic radiator comprising an array of radiator elements, the method comprising:
   the wireless communications device receiving baseband information; and
   the wireless communications device transmitting an electromagnetic signal from the electromagnetic radiator by applying a carrier signal to the electromagnetic radiator, the applying a carrier signal comprising continuously rotating a feed point of the carrier signal between the radiator elements at an angular rate and at an instantaneous radius relative to a common reference point, and varying the instantaneous radius, in real time, based on the received baseband information.

8. The method according to claim 7, wherein the radiator elements each has a respective radial position relative to the common reference point, and the transmitting an electromagnetic signal comprises selecting one or more of the radiator elements in real-time each based on the respective radial position thereof and the instantaneous radius, and applying the carrier signal to the one or more selected radiator elements.

9. The method according to claim 8, wherein the selecting the one or more radiator elements comprises (i) varying a diameter of the electromagnetic signal, in real time, by varying the instantaneous radius based on one characteristic of the received baseband information, and (ii) varying the rate of angular rotation based on another aspect of the received baseband information.

10. The method according to claim 9, wherein the transmitting an electromagnetic signal further comprises varying at least one of a frequency and a phase of the carrier signal based on the baseband information.

11. The method according to claim 8, wherein the transmitting an electromagnetic signal further comprises varying at least one of a frequency and a phase of the carrier signal based on the baseband information.

12. The method according to claim 8, wherein the selecting the one or more radiator elements comprises selecting the one or more radiator elements so as to produce at least two distinct simultaneous transmissions of the electromagnetic signal.

\* \* \* \* \*